Nov. 19, 1963  A. M. BEST  3,111,115
FORAGE DISTRIBUTING AND CONVEYING APPARATUS
Filed Oct. 13, 1961  2 Sheets-Sheet 1
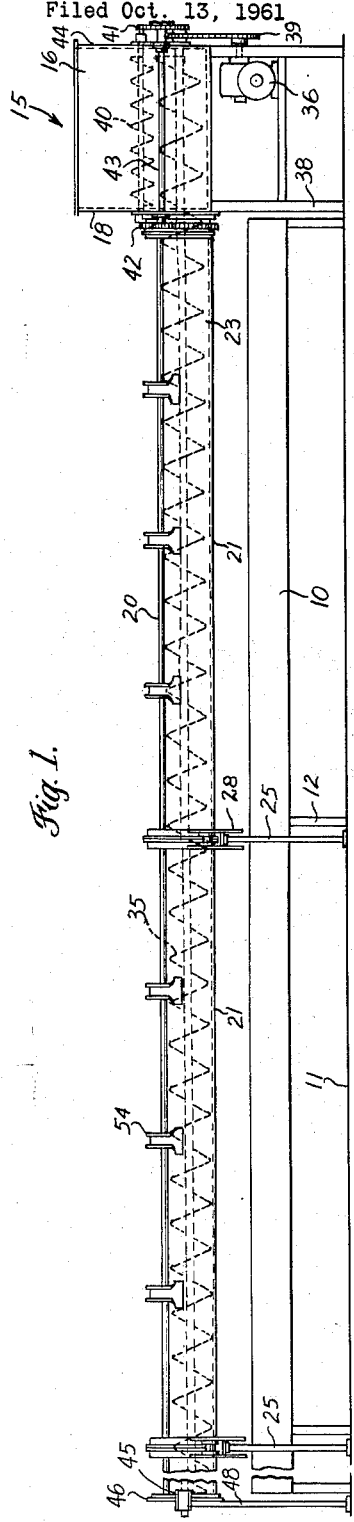
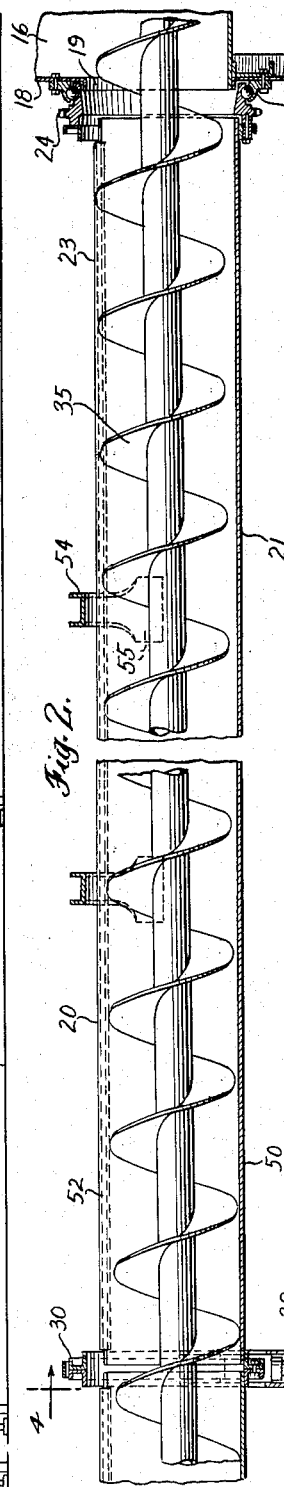
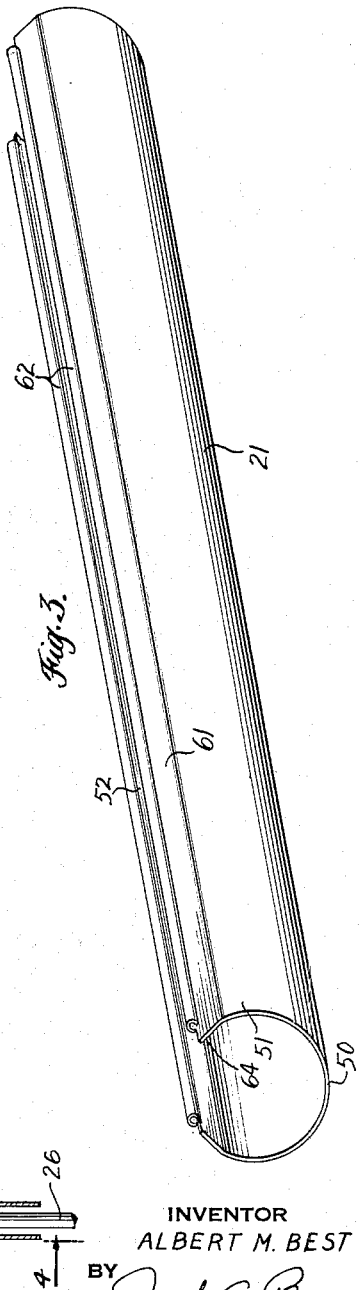
INVENTOR
ALBERT M. BEST
BY
ATTORNEY Nov. 19, 1963　　　A. M. BEST　　　3,111,115
FORAGE DISTRIBUTING AND CONVEYING APPARATUS
Filed Oct. 13, 1961　　　　　　　　2 Sheets-Sheet 2
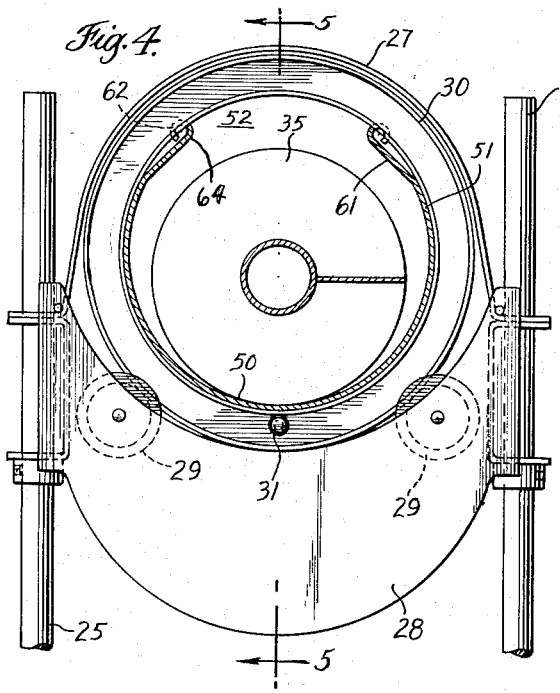
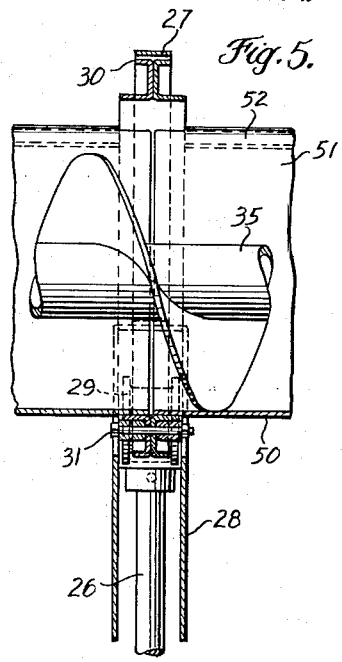
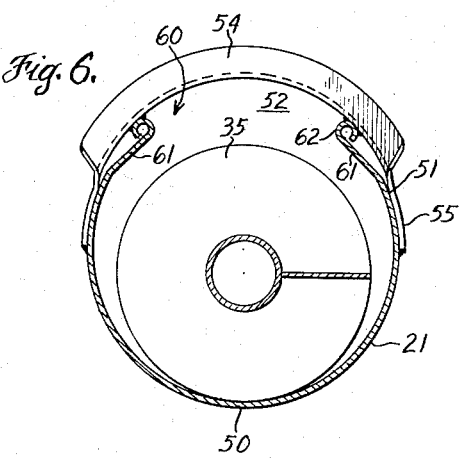
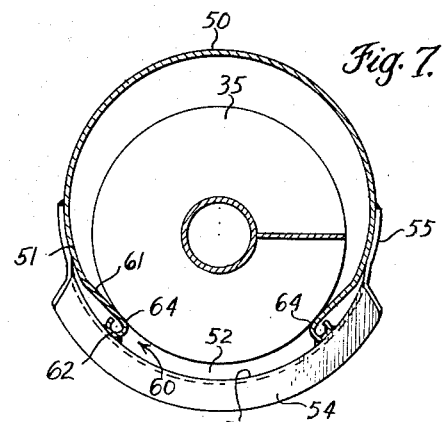
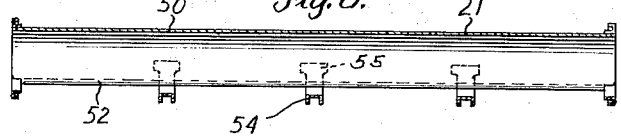
INVENTOR
ALBERT M. BEST
BY
ATTORNEY

United States Patent Office 3,111,115
Patented Nov. 19, 1963

3,111,115
FORAGE DISTRIBUTING AND CONVEYING
APPARATUS
Albert M. Best, New Holland, Pa., assignor to Sperry Rand Corporation, New Holland, Pa., a corporation of Delaware
Filed Oct. 13, 1961, Ser. No. 144,967
6 Claims. (Cl. 119—52)

This invention relates to a device for conveying and distributing forage and the like to stock animals. More particularly, the invention relates to a feeder having a rotatable container in which an auger is operable, the container being of an improved design to provide better support for the auger.

One type of crop material feeder comprises a hopper having an outlet opening. Communicating with the outlet opening is an elongated sheet metal container which comprises a desired number of container sections. For example, if a feeding device is desired which is one hundred and fifty feet long, fifteen ten foot container sections can be employed and interconnected to each other. Material is drawn from the hopper and conveyed through the container by an auger which is supported at one end on the hopper and at its terminal end on a suitable bracket structure. Intermediate its ends, the auger rests on the bottom of the feeder container and is supported thereby.

Conventionally, the container bottom is cylindrical and provides a proper seat for the cylindrical auger. Movement of the auger flights relative to the bottom of the container is cushioned and lubricated by the crop material being conveyed. The auger is free to float between its ends and material conveyed is able to get between the periphery of the auger flighting and the container. For emptying the container, after material has been distributed along the length thereof by the auger, a continuous slot is provided in the container. Such slot is normally located in an upper position and the container is adapted to be rotated about its longitudinal axis to move the slot to a lower position whereby the contents of the container will be dumped and emptied. Straps are provided at longitudinally spaced locations along the container which extend across the slot and strengthen the container structure.

One problem which has resulted is the support of the auger conveyor when the elongated container is in inverted position. When in normal position, with the container slot in an upper position, the auger has proper support on the container bottom. However, when the container is rotated and inverted, the cylindrical container bottom is moved away from the auger and the auger comes into engagement with the discharge slot. If the flights of the auger project through the slot, they may engage the strengthening straps and damage to the structure may result.

One solution for this problem is to provide straps which have an axial length greater than the distance between successive flights of the auger. Thus, the auger is capable of being supported on the straps when the container is inverted. However, such long connecting straps are undesirable because they interfere with the discharge of material. It is preferable to provide strengthening straps for the container which are narrow and provide only a minor obstruction to the discharge of material.

One object of this invention is to provide a feeder device of the character described having a rotatable, slotted container made up of a plurality of sections each of which is of improved design to provide better support for the feeder auger when the container is in inverted position.

Another object of this invention is to provide a feeder device having a slotted container which will properly support an auger operable therein regardless of whether the container is in upright normal position or in an inverted discharge position.

Another object of this invention is to provide, in a feeder device of the character described, elongate container sections each of which has a slot from one end of the section to the other and provided with straps across such slot at axially spaced intervals, such straps being narrow and of limited axial extent whereby when the container is inverted to dump its contents the discharge of material is not impaired by the straps.

A further object of this invention is to provide a container structure of the character described having means thereon which insures against the engagement of the auger flighting of the conveying device and the straps of the container.

A still further object of this invention is to achieve the fore-going objects with a structure which is relatively inexpensive.

Other objects of this invention will be apparent hereinafter from the specification and from the recital in the appended claims.

In the drawings:

FIG. 1 is a fragmentary side elevation of a stock feeding device having elongated, interconnected container sections constructed according to this invention;

FIG. 2 is a fragmentary enlarged longitudinal vertical section adjacent the hopper end of the device and showing some structural details of the feeding device;

FIG. 3 is a perspective view of one of the sections of the container through which feed is conveyed;

FIG. 4 is an enlarged transverse section taken on the line 4—4 of FIG. 2 looking in the direction of the arrows;

FIG. 5 is a section taken on the line 5—5 of FIG. 4 looking in the direction of the arrows;

FIGS. 6 and 7 are transverse sections showing the feeder container in normal position in FIG. 6 and in inverted position in FIG. 7; and FIG. 8 is a longitudinal section of one of the conveyor sections, on a small scale and in inverted position, illustrating the strengthening straps of the container.

Referring now to the drawings by numerals of reference, and first to FIG. 1, 10 denotes an elongated feed bunk for stock animals. The bunk 10 extends horizontally and is supported on the ground 11 or on a concrete apron or the like, by suitable support legs 12. For simultaneously depositing a ribbon of feed along the full length of the bunk 10, a feeder device 15 is provided comprising a hopper 16 mounted at one end of the bunk. Hopper 16 has a side wall 18 provided with an opening 19 (FIG. 2) for the discharge of material. Communicating with the opening 19 is a horizontally extending elongated container 20 comprising a plurality of interconnected container sections 21. All of the container sections are similarly constructed and each may be of any desired length. The number of sections used depends upon the overall length of the conveyor desired. A first container section 23 is connected to the side wall 18 of the hopper 16 by means including a thrust and radial bearing 22, FIG. 2, which permits rotatable movement of the container 20 relative to the hopper 16. The connection of the container with the hopper includes a drive sprocket 24 through which power can be supplied to rotate the container.

At the points where successive container sections meet, support stands 25 are provided, constructed as shown best in FIG. 4. Each stand comprises a pair of vertically extending pipes 26 interconnected by transversely extending spaced plates 28 which support rollers 29. The ends of the container sections are provided with flanged portions 30 FIG. 5 adapted to ride on the roller 29 so that the conveyor 20 may be freely rotated. The flanged portion of one container section is connected to the flanged portion of the next container section by a single bolt 31 (FIG. 4). Bands 27 are spaced from and extend over portions 30 to prevent the container sections from moving upwardly relative to the stands.

Material is withdrawn from hopper 16 and distributed along the full axial length of the container 20 by an auger 35 adapted to be rotated in the proper direction by a motor 36 (FIG. 1) carried on a support frame 38 of the hopper. Motor 36 operates through drive train 39 to rotate the auger. An agitator auger 40 is provided in the hopper 16 which is driven by a chain 41 connected to the same drive which operates the auger. A chain 42 is provided and extending around sprocket 24 for rotating the container 20. Chain 42 is driven by a means including a shaft 43 connected to motor 36. Suitable clutch means, not shown, is provided to produce a rotation of the container 20 when it is desired to do so.

One end of auger 35 is supported on side wall 44 of the hopper 16 and the terminal end 45 of the auger is rotatably supported on bracket 46 of stand 48, FIG. 1. Intermediate its ends, the auger is free floating, resting upon the bottom of each container section 21. The auger extends slightly downwardly as it leaves hopper 16 until it engages the container 21; then it extends along the container until the terminal end of the device is reached.

As shown best in FIGS. 3–7, each container section 21 comprises a bottom portion 50 and a top portion 51. Each container section is semi-cylindrical and of larger diameter than the auger 35. The top portion 51 of each container section is provided with a relatively wide slot 52 which extends from one axial end of each container section to the other. Also, such slot extends parallel to the axis of the container and auger 35. For providing the individual container sections with stability, three narrow arcuate straps 54 are provided having relatively wide ends 55 which are welded, brazed or otherwise affixed to the sides of the container section. The curvature of the inside surfaces 53 of the straps matches the outside diameter of the container section. As shown in FIGS. 1 and 8, the axial extension of the straps 54 is not great. Of the three straps, one strap is located approximately at the middle of the container section and the other two straps being located about midway between the middle strap and the ends of the container section.

When the auger 35 is operating to fill the container 20, the structure is located as shown in FIG. 6 with the bottom portion 50 of each container section in a lower position and the slot 52 in a top position. However, when the container is rotated to the position shown in FIG. 7, the slot 52 is moved to a lower location whereupon feed is dumped from the container and evenly distributed along the full length thereof and deposited in the feed trough 10. When the container is so located that the slot 52 is in its upper position as shown in FIG. 6, there is no problem for supporting the auger 35. However, when in inverted position, auger support problems are created and there must be assurance that the flights of the auger do not engage or catch onto straps 54.

For supporting auger 35 when it is in inverted position, and for protecting against the flights of the auger from engaging straps 54, auger support means 60 is provided comprising guide surfaces or flats 61 on opposite sides of the slot 52 and projecting inwardly relative to the container section 21. The ends of flats 61 are provided with beads 62 which extend from one end of each container section to the other and project radially outwardly. The outer portion of each bead 62 is contiguous to the inner surfaces 53 of the straps 54 and are welded to the straps as shown. This provides a rugged structure and prevents the container sections from bowing or twisting when a rotation of the overall container is provided to empty the contents thereof. The longitudinally extending flats 61 and the beads 62 provide shoulders 64 on which the auger 35 rides when the container sections are in inverted position. As is shown in FIG. 7, the periphery of the auger is substantially spaced radially inwardly from the straps 54 when the container is inverted. There is no danger, therefore, of the auger flights engaging the straps.

With the structure described, a relatively wide slot 52 is possible and all of the feed in the container 20 can be dumped therefrom on one continuous rotating cycle of the container. There is no necessity for stopping the container with the slot 52 in its lower position in order to insure that all of the material will be discharged. The slot 52 is wide enough to insure that all of the material will drop out during a rotating cycle. The shoulders 64 insure that the auger 35 will be properly supported regardless of the rotatable position of the container. The single bolt connection 31 between successive conveyor sections allows some deflection of one section to the next when the conveyor is rotated.

While this invention has been described in connection with a particular embodiment thereof, it will be understood that it is capable of modification, and this application is intended to cover any variations, uses, or adaptations, following, in general, the principles of the invention and including such departures from the present disclosure as come within known or customary practice in the art to which the invention pertains, and as fall within the scope of the invention or the limits of the appended claims.

Having thus described my invention, what I claim is:

1. A device for distributing forage and other material comprising, in combination, an elongated container the longitudinal axis of which is generally horizontal, means supporting said container for rotation about said axis, said container normally being disposed in a given stationary position and having a bottom portion and a top slot, said slot extending substantially from one axial end of the container to the other and parallel to said axis, an auger within said container and operative to convey material along the length of the container, said auger being supported on said container bottom portion when the container is in said normal position, means for rotating said container to move said slot to a lower position whereby material in the container may be discharged through said slot, and inwardly projecting shoulder means including auger supporting guide surfaces on said container and adjacent said slot for supporting said auger spaced radially inwardly of the slot when the slot is in said lower position.

2. A device for distributing forage and other material comprising, in combination, an elongated semi-cylindrical container the longitudinal axis of which is generally horizontal, means supporting said container for rotation about said axis, said container normally being disposed in a given stationary position and having a bottom portion and a top slot, said slot extending substantially from one axial end of the container to the other and parallel to said axis, an auger within said container and operative to convey material along the length of the container, said auger being supported on said container bottom portion when the container is in said normal position, means for rotating said container to move said slot to a lower position whereby material in the container may be discharged through said slot, and inwardly projecting shoulder means on said container and adjacent said slot for supporting said auger spaced radially inwardly of the slot when the slot is in said lower position, said shoulder means comprising a pair of longitudinally extending shoulders, one on each side of said slot, and auger supporting guide surfaces extending inwardly from said container to said shoulders.

3. A device as recited in claim 2 wherein an arcuate strap is affixed to said container and rotatable therewith, said strap extending transverse to said longitudinal axis and across said slot.

4. A device as recited in claim 3 wherein the strap has ends affixed to said container and a curved inside surface, such curvature having substantially the same radius as the radius of said semi-cylindrical container.

5. A device as recited in claim 4 wherein each shoulder has an outwardly projecting bead, the radial outer portion of said bead engaging said curved surface of the inside of said strap.

6. A device as recited in claim 4 wherein said strap is narrower than the axial length of one auger flight to the next on said auger.

References Cited in the file of this patent

UNITED STATES PATENTS

| | | |
|---|---|---|
| 2,731,969 | Hoeksema | Jan. 24, 1956 |
| 2,940,639 | Winter | June 14, 1960 |